(12) United States Patent
Ziegler et al.

(10) Patent No.: US 8,699,819 B1
(45) Date of Patent: Apr. 15, 2014

(54) MOSAICING DOCUMENTS FOR TRANSLATION USING VIDEO STREAMS

(75) Inventors: Andrew Moore Ziegler, La Jolla, CA (US); Leon Palm, Santa Monica, CA (US)

(73) Assignee: Google Inc., Mountain View, CA (US)

( * ) Notice: Subject to any disclaimer, the term of this patent is extended or adjusted under 35 U.S.C. 154(b) by 63 days.

(21) Appl. No.: 13/468,358

(22) Filed: May 10, 2012

(51) Int. Cl.
*G06K 9/36* (2006.01)

(52) U.S. Cl.
USPC .......................... 382/284; 382/103; 358/497

(58) Field of Classification Search
USPC .................................................. 382/103, 181
See application file for complete search history.

(56) References Cited

U.S. PATENT DOCUMENTS

| | | | | |
|---|---|---|---|---|
| 4,949,391 | A * | 8/1990 | Faulkerson et al. | 382/313 |
| 5,457,308 | A * | 10/1995 | Spitz et al. | 235/462.12 |
| 5,625,720 | A * | 4/1997 | Miyaza et al. | 382/284 |
| 5,767,987 | A * | 6/1998 | Wolff et al. | 358/447 |
| 7,123,292 | B1 * | 10/2006 | Seeger et al. | 348/218.1 |
| 8,195,659 | B2 * | 6/2012 | Hull et al. | 707/736 |
| 8,521,737 | B2 * | 8/2013 | Hart et al. | 707/736 |
| 2006/0103893 | A1 * | 5/2006 | Azimi et al. | 358/474 |
| 2009/0052743 | A1 * | 2/2009 | Techmer | 382/107 |

OTHER PUBLICATIONS

A. Iketani et al., "Video Mosaicing Based on Structure from Motion for Distortion-Free Document Digitization", pp. 73-84, 2007.
R. Marzotto et al., "High Resolution Video Mosaicing with Global Alignment", Proceedings of the 2004 IEEE Computer Society Conference, Jun. 27-Jul. 2, 2004, vol. 1 pp. 692-698.
J. Hannuksela et al., "Document Image Mosaicing with Mobile Phones", ICIAP 2007 Proceedings of the 14th International Conference on Image Analysis and Processing, IEEE Computer Society, Washington, DC, USA.
J. Liang et al., "Camera-Based Document Image Mosaicing", Pattern Recognition, 2006, ICPR 2006, 18th International Conference.
M. Calonder et al., "Brief: Binary Robust Independent Elementary Features", 11th European Conference on Computer Vision, Heraklion, Crete, Springer, Sep. 2010.

* cited by examiner

*Primary Examiner* — Tom Y Lu
(74) *Attorney, Agent, or Firm* — Fish & Richardson P.C.

(57) ABSTRACT

Aspects of the present disclosure propose techniques for reconstructing a document mosaic using video streams of the document. The streams provide information identifying a layout that relates sequential frames of a video to each other. Once the streams are captured using a mobile device, it is then possible to reconstruct a virtual view of the entire document as though it were taken with a single camera shot. The reconstructed virtual view of the document will be suitable as input to an optical character recognition engine, which can be used for translating the document.

20 Claims, 10 Drawing Sheets

FIG. 1

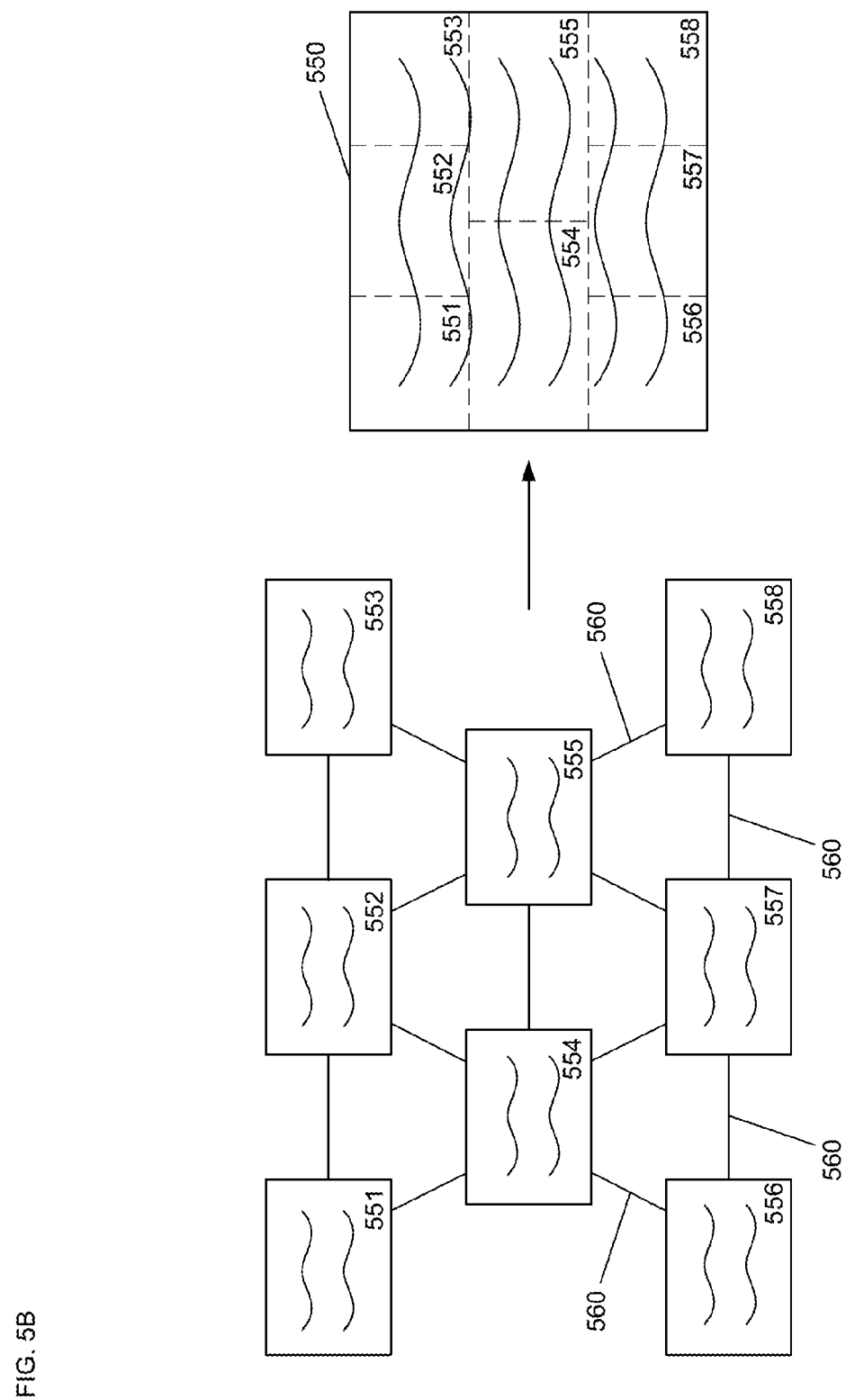

MOSAICING DOCUMENTS FOR TRANSLATION USING VIDEO STREAMS

BACKGROUND

To capture an image of a large document for translation, a user may be required to take several still images of the document. The user may capture a first image of the document from a first position. A mobile application may then direct the user to move the device to another part of the document to capture the next still image. Typically, movement of the device stops when the next position is reached otherwise the images may be blurred. To translate the captured images, users may have to align text carefully so that the entire text can be captured with a single image.

SUMMARY

Aspects of this disclosure may be advantageous for rapidly reconstructing video streams into high quality document images capable of being translated. By introducing techniques to reduce a number of processing failures, better homographies may be calculated, and final images comprising sequential video frames may be rendered faster.

One aspect of the disclosure provides a method that includes receiving a plurality of digital images captured in a video stream. The plurality of digital images collectively includes a full view of one side of a document. The method includes identifying pairs of video frames from the plurality of digital images. Each video frame may include a number of feature points. The method also includes determining, using a processor, feature point descriptors based on the feature points, calculating a mapping between each pair of video frames based on the feature point descriptors, and rendering an assembled image from the mapping that depicts the full view of the one side of the document. The mapping is indicative of a similarity between the feature point descriptors. In one example, the video stream is captured using a mobile phone. In another example, the feature point descriptors are computed from pixels surrounding the feature points. In this example, the similarity between the feature point descriptors is based on a number of corresponding pixels between the feature point descriptors. In yet another example, the method may also include binning a number of feature point descriptors from the pair of video frames into corresponding grids, and comparing the binned feature point descriptors from the corresponding grids.

Another aspect of the disclosure provides a system that includes a memory storing a plurality of digital images captured in a video stream. The plurality of digital images collectively includes a full view of one side of a document. The system includes a processor coupled to the memory. The processor is configured to identify pairs of video frames from the plurality of digital images. Each video frame includes a number of feature points. The processor is also configured to: determine feature point descriptors based on the feature points, calculate a mapping between each pair of video frames based on the feature point descriptor and render an assembled image from the mapping that depicts the full view of the one side of the document. The mapping is indicative of a similarity between the feature point descriptors.

Yet another aspect of the disclosure provides a tangible, computer-readable storage medium that includes instructions of a program, when executed by a processor, cause the processor to perform a method. The method includes receiving a plurality of digital images captured in a video stream. The plurality of digital images collectively includes a full view of one side of a document. The method includes identifying pairs of video frames from the plurality of digital images. Each video frame comprising a number of feature points. The method also includes determining, using the processor, feature point descriptors based on the feature points, calculating a mapping between each pair of video frames based on the feature point descriptors and rendering an assembled image from the mapping that depicts the full view of the one side of the document. The mapping is indicative of a similarity between the feature point descriptors.

BRIEF DESCRIPTION OF THE DRAWINGS

FIG. 5B is an illustration of a homography graph in accordance with an aspect of the disclosure.

DETAILED DESCRIPTION

Aspects, features and advantages of this disclosure will be appreciated when considered with reference to the following description of embodiments and accompanying figures. It should be noted that the same reference numbers in different drawings may identify the same or similar elements. Furthermore, the following description is not limiting; the scope of the present technology is defined by the appended claims and equivalents.

In this disclosure, systems and methods are provided for reconstructing a document mosaic using video streams of a document. The video streams provide information identifying a layout that relates sequential frames, e.g., images, of a video to each other. Once the video streams are captured, it may then be possible to reconstruct a virtual view of the entire document from images in the video stream. In some aspects, the resulting document mosaic may be sent directly to an optical character recognition (OCR) engine for recognition and translation.

Figure 1:
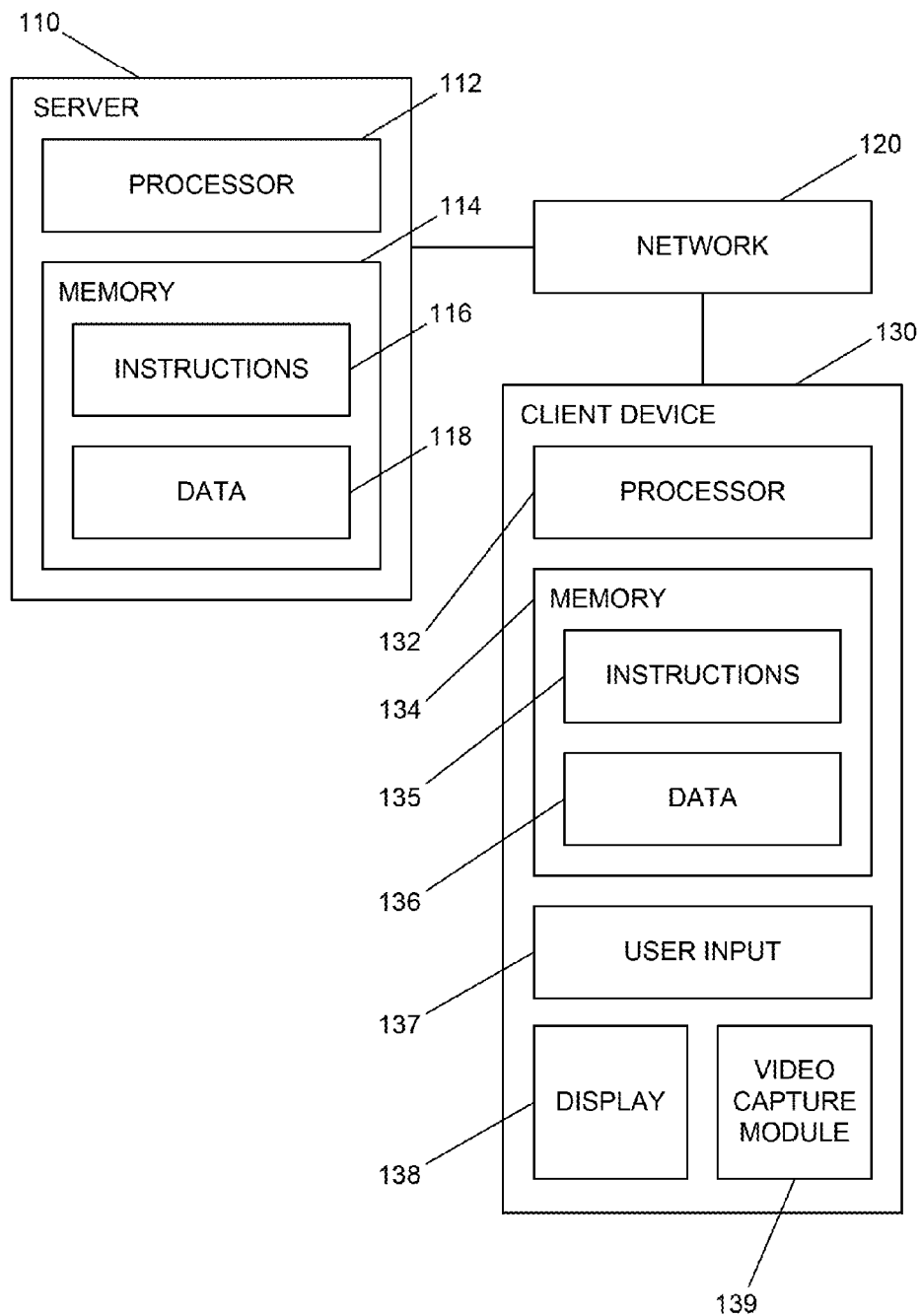
FIG. 1 is a functional diagram of a system in accordance with aspects of the disclosure.

FIG. 1 is a functional diagram of a system 100. As shown, the system 100 may include a server 110 coupled to a network 120. The system may also include a client device 130 capable of wireless communication with the server 110 over the network 120.

The server 110 may contain a processor 112, memory 114, and other components typically present in general purpose computers. The memory 114 of server 110 stores information accessible by the processor 112, including instructions 116 that can be executed by the processor 112. Memory may also include data 118 that can be retrieved, manipulated or stored by the processor 112. The memory 114 may be a type of non-transitory computer readable medium capable of storing information accessible by the processor 112, such as a hard-drive, memory card, ROM, RAM, DVD, CD-ROM, write-capable, and read-only memories. The processor 112 may be a well-known processor or other lesser-known types of processors. Alternatively, the processor 112 may be a dedicated controller such as an ASIC.

The instructions 116 may be a set of instructions executed directly, such as machine code, or indirectly, such as scripts, by the processor 112. In this regard, the terms "instructions," "steps" and "programs" may be used interchangeably herein. The instructions 116 may be stored in object code format for direct processing by the processor 112, or other types of computer language including scripts or collections of independent source code modules that are interpreted on demand or compiled in advance. Functions, methods and routines of the instructions are explained in more detail below.

The data 118 may be retrieved, stored or modified by the processor 112 in accordance with the instructions 116. For instance, although the system and method is not limited by a particular data structure, the data 118 may be stored in computer registers, in a relational database as a table having a plurality of different fields and records, or XML documents. The data 118 may also be formatted in a computer-readable format such as, but not limited to, binary values, ASCII or Unicode. Moreover, the data 118 may include information sufficient to identify relevant information, such as numbers, descriptive text, proprietary codes, pointers, references to data stored in other memories including other network locations, or information that is used by a function to calculate relevant data.

Although FIG. 1 functionally illustrates the processor 112 and memory 114 as being within the same block, the processor 112 and memory 114 may actually include multiple processors and memories that may or may not be stored within the same physical housing. For example, some of the instructions and data may be stored on a removable CD-ROM and others within a read-only computer chip. Some or all of the instructions and data may be stored in a location physically remote from, yet still accessible by, the processor 112. Similarly, the processor 112 may actually include a collection of processors, which may or may not operate in parallel.

The server 110 may be at one node of network 120 and capable of directly and indirectly communicating with other nodes of the network 120. For example, the server 110 may include a web server that can be capable of communicating with the client device 130 via network 120 such that it uses the network 120 to transmit and display information to a user on display 138 of the client device 130. Server 110 may also include a plurality of computers, e.g., a load balanced server farm, that exchange information with different nodes of a network for the purpose of receiving, processing and transmitting data to client devices. In this instance, the client devices will typically still be at different nodes of the network 120 than the computers comprising server 110. According to various aspects, processing video streams to reconstruct a document mosaic can be performed by the client device 130, the server 110, or by some combination thereof.

Client device 130 may be configured similarly to server 110, with a processor 132, memory 134, instructions 135, and data 136. Each client may be a personal computer, intended for use by a person having all the internal components normally found in a personal computer such as a central processing unit (CPU), CD-ROM, hard drive, and a display device 138, for example, a monitor having a screen, a projector, a touch-screen, a small LCD screen, a television, or another device such as an electrical device that can be operable to display information processed by the processor, speakers, a modem and/or network interface device, user input 137, such as a mouse, keyboard, touch screen or microphone, and all of the components used for connecting these elements to one another. Moreover, computers in accordance with the systems and methods described herein may include devices capable of processing instructions and transmitting data to and from humans and other computers including general purpose computers, PDAs, network computers lacking local storage capability, set top boxes for televisions, and other networked devices.

Although the client device 130 may include a full-sized personal computer, the systems and methods of this disclosure may also be used in connection with mobile devices capable of wirelessly exchanging data over a network such as the Internet. By way of example only, client device 130 may be a wireless-enabled PDA, tablet PC, or a cellular phone capable of sending information via the Internet. The user may input information, for example, using a small keyboard, a keypad, or a touch screen. It should be noted that multiple client devices can be used simultaneously in a typical system configuration.

As shown in FIG. 1, the client device 130 may include a video capture module 139. The video capture module 139 can be used to capture video images of an object. The video capture module 139 may be a software module operable in conjunction with a video camera or may include a video graphing device, such as a video digital camera having image processing components. For example, the client device 130 may be connected to a video digital camera that can operate in conjunction with the video capture module 139. The video capturing module 139 can also operate in conjunction with other video capturing systems known in the arts such as a digital camera with video capture capabilities, a camera in a mobile phone, a video camera or other devices with video capture features.

The client device 130 is shown coupled to memory 134, which can store captured video. Video images can also be stored on a removable medium such as a disk, tape, SD Card or CD-ROM, which can be connected to system 100. The client device 130 can also digitally format the captured video images. More specifically, captured video images can be passed to the client device 130 where the processor 132 can covert the captured video images to a digital format.

The server 110 and client device 130 are capable of direct and indirect communication such as over network 120. Although only one server is depicted in FIG. 1, it should be appreciated that a typical system can include a large number of connected servers, with each different server being at a different node of the network 120. The network 120, and intervening nodes, may include various configurations and protocols including the Internet, World Wide Web, intranets, virtual private networks, wide area networks, local networks, private networks using communication protocols proprietary to one or more companies, Ethernet, WiFi, such as 802.11, 802.11b, g, n, or other such standards, and HTTP, and various combinations of the foregoing. Such communication can be facilitated by a device capable of transmitting data to and from other computers, such as modems, such as dial-up, cable or fiber optic, and wireless interfaces.

Although certain advantages are obtained when information is transmitted or received as noted above, other aspects of the system and method are not limited to a particular manner of transmission of information. For example, in some aspects, information may be sent via a medium such as a disk, tape or CD-ROM. Yet further, although some functions are indicated as taking place on a single server having a single processor, various aspects of the system and method may be implemented by a plurality of servers, for example, communicating information over network 120. In addition to the components described above and illustrated in the figures, various operations will now be described.

Figure 2:
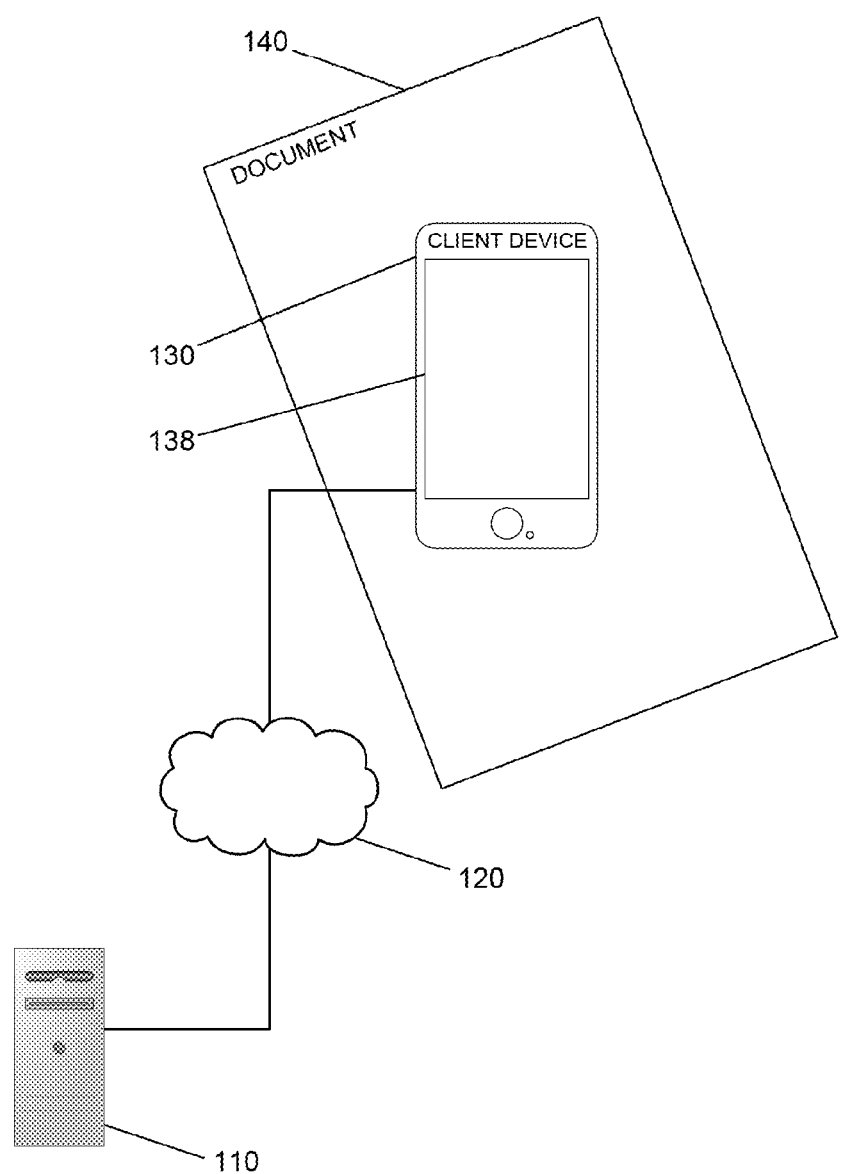
FIG. 2 is a pictorial diagram of a system in accordance with aspects of the disclosure.

FIG. 2 is a pictorial diagram of a system 100. As shown, the system 100 may include a client device 130 capable of wireless communication over a network 120 to a server 110. In FIG. 2, client device 130 is shown scanning document 140 in accordance with system 100. According to aspects of this disclosure, one document may be scanned at a time. The client device display 138 may show a current region of the document being captured. This may aid a user in navigating all regions of the document 140. Video images can be captured sequentially with a pre-determined measure of overlapping pixels detected between two video frames. In this regard, the document 140 can be positioned in a roughly planar state, e.g., flat or level, to assist scanning.

Figure 3:
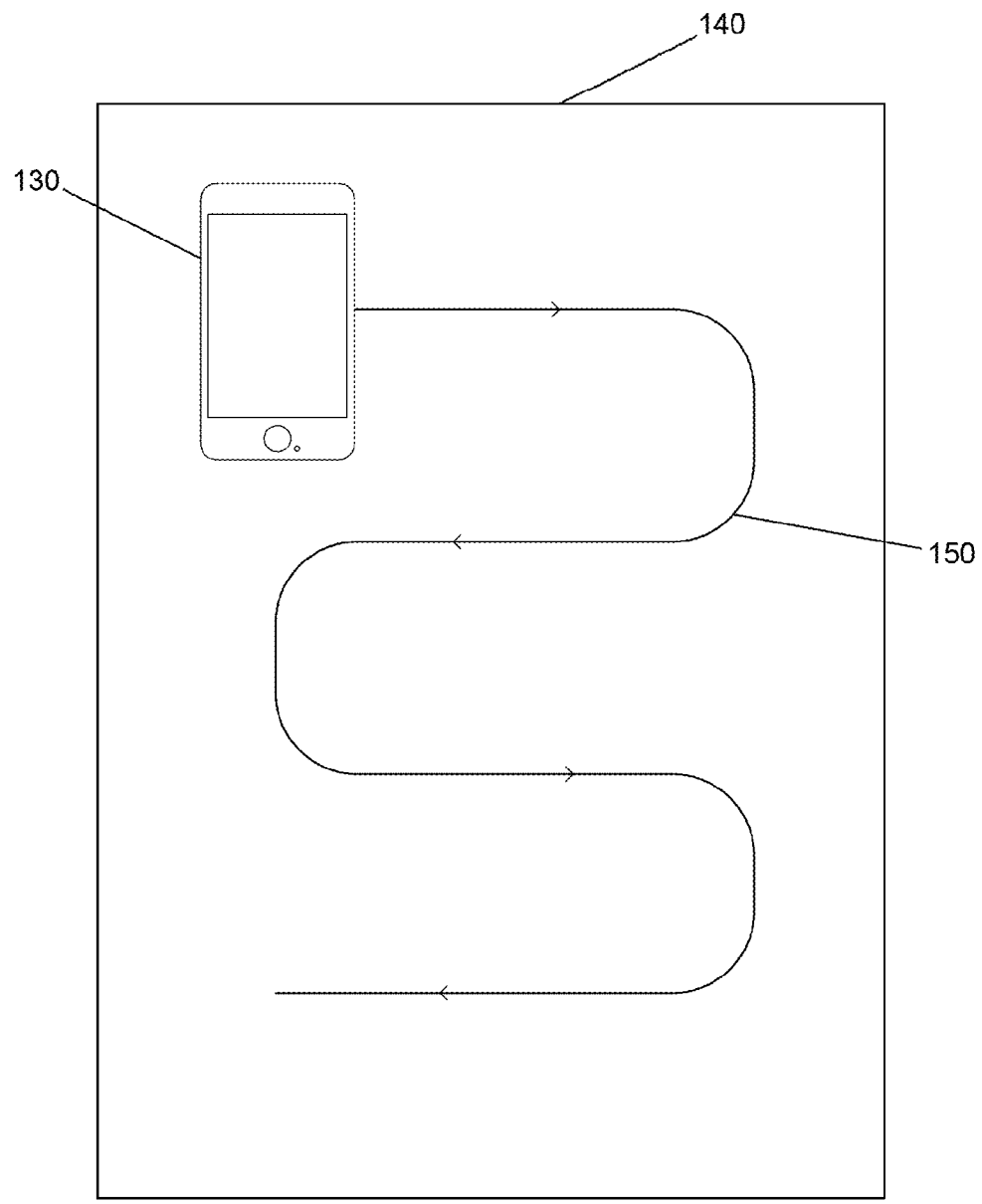
FIG. 3 is a diagram that illustrates a client device in accordance with an aspect of the disclosure.

FIG. 3 is a diagram that illustrates a client device 130 in accordance with an aspect of the present technology. As shown, a user may scan the client device 130 over a physical document 140 to capture a video stream of the document 140 with the device 130. The user may position the device 130 at a corner of the document 140 and engage a video camera or another image capture device. The user may then in a continuous motion scan the device 130 over the document 140. A scanning path 150 may, for example, start from the document's left side and continue to its right side and then back again. The device 130 can be moved downward or upward after each iterative scan across the document 140. This can provide device 130 access to other regions of the document 140 for scanning. Scanning may be completed once all sections of the document 140 have been captured. It should be understood that this example is used for illustrative purposes and that capturing video images of document 140 can be performed using various techniques. For example, the document 140 may be scanned using a continuous motion in other directions.

Figure 4:
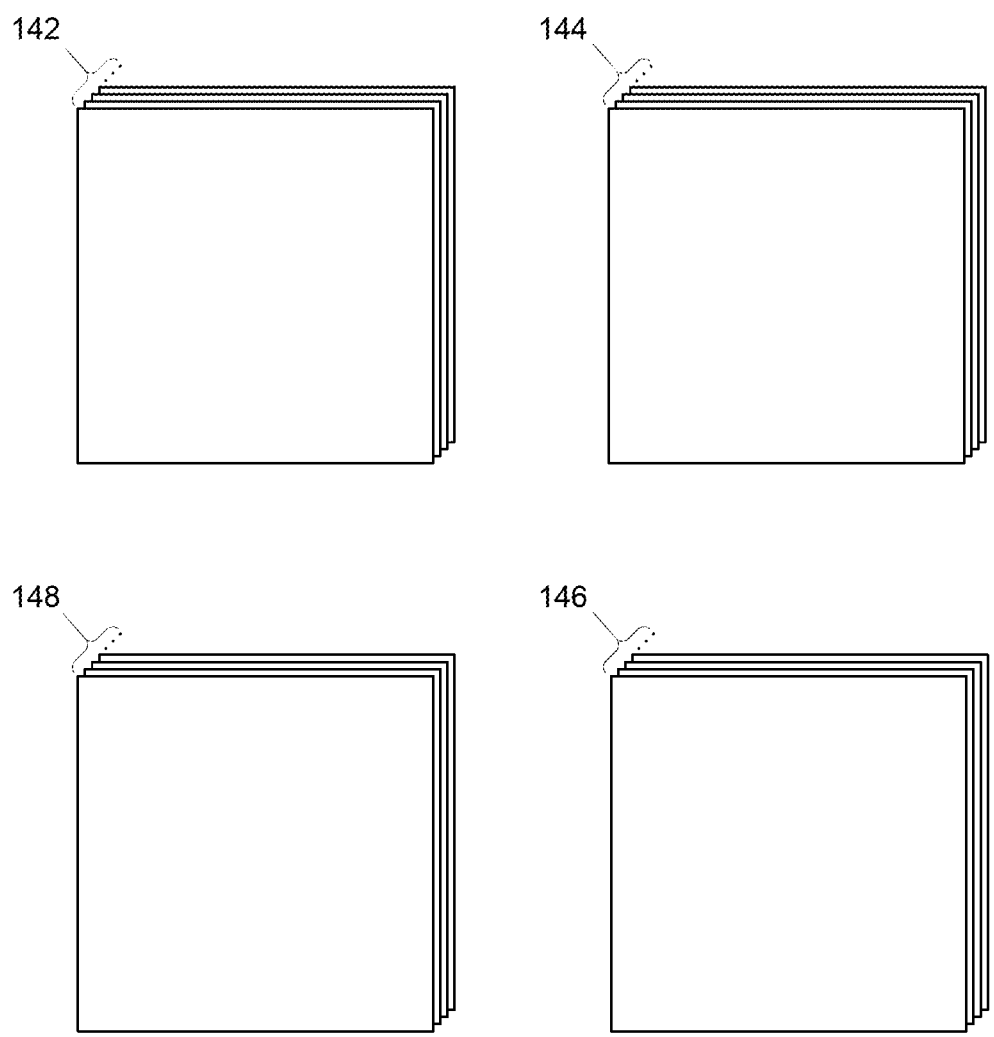
FIG. 4 is a pictorial diagram of captured video frames in accordance with an aspect of the disclosure.

FIG. 4 is a pictorial diagram of captured video frames 142, 144, 146, 148. It should be appreciated that the video frames 142, 144, 146, 148 shown in FIG. 4 may include a number of video images. Each image may be extracted in sequence from a video stream. A video stream may therefore be composed of a plurality of video images, taken by a client device such as the device 130 described with respects to FIG. 3. As discussed previously, a video stream may provide information identifying a layout that relates sequential video frames to each other. This prior knowledge may be used to blend video frames together to create a mosaic document.

The captured video frames may include partial views of document 140. For example, captured video frame 142 may include a top left corner view of the document 140, captured video frame 144 may include a top right corner view of the document 140, captured video frame 146 may include a lower right corner view of the document 140, captured video frame 148 may include a lower left corner view of the document 140. In one example, each of the captured video frames 142, 144, 146 and 148 may include a number of sequential video frames, which in aggregate may include a complete sectional view of document 140.

Figure 5A:
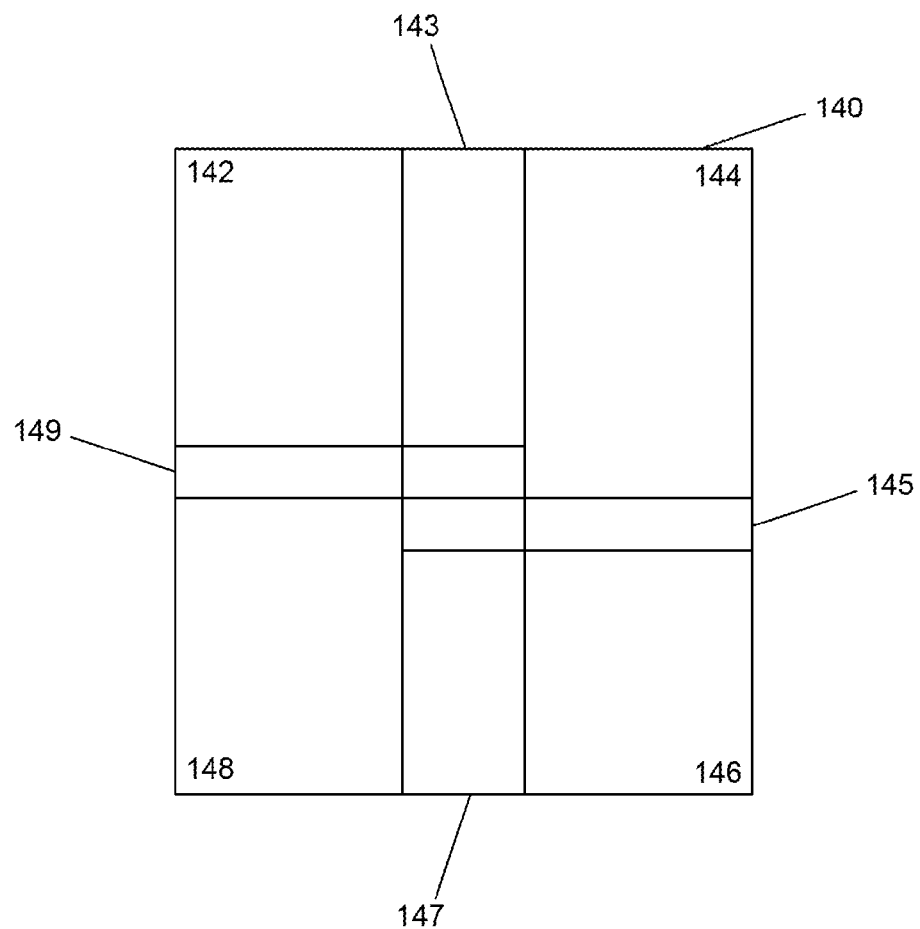
FIG. 5A is a diagram that illustrates overlaying video frames in accordance with an aspect of the disclosure.

According to some aspects, a homography may be calculated between video frames for a number of video frames extracted from a video stream. A homography defines a map of homogenous coordinates between video frames, e.g., sequential video images, which may be used to determine an alignment to correctly blend together corresponding video frames making up the video stream. By way of example only, in FIG. 5A, captured video frames 142, 144, 146 and 148 are shown overlaid. As in this example, overlapping sections 143, 145, 147 and 149 of the video frames may be warped together into a homography graph, e.g., blended together using homography mappings.

FIG. 5B is an illustration of a homography graph 550. A homography graph 550 is an undirected graph, such as a graph in which nodes are connected by edges that have no directional arrow where nodes are frames 551-58 of a video stream and edges 560 are homographies providing a mapping between the frames. According to one aspect, to generate a homography graph 550, the graph 550 is initially emptied. A vertex may be created for each frame 551-58 extracted from a video stream. In this example, a first frame 551 may be chosen as an initial reference frame. Bounds of subsequent frames such as frames 552-558, are warped into this space using concatenated homographies. For example, when a subsequent frame is warped into the homography graph 550, a homography to the previous frame may be computed to provide an edge 560. After all of the video frames are captured, the graph 550 may resemble a doubly linked list with the frames in sequential order, for example, a linked data structure that consists of a set of sequentially linked records where each record represents a video frame.

According to aspects, calculating a homography mapping between video frames involves identifying and tracking feature points, e.g., distinguishable image pixels, from frame to frame in a video stream. An important aspect of a feature point is that it can be differentiated from its neighboring image points, such as other pixels within an image. For example, printed text has a high contrast to background ratio, thus a feature point could be where there are sharp changes in the gradient near terminal points of the printed characters. By contrast, an image of a plain white paper without text may not have feature points because neighboring image points may be overly similar.

Figure 6:
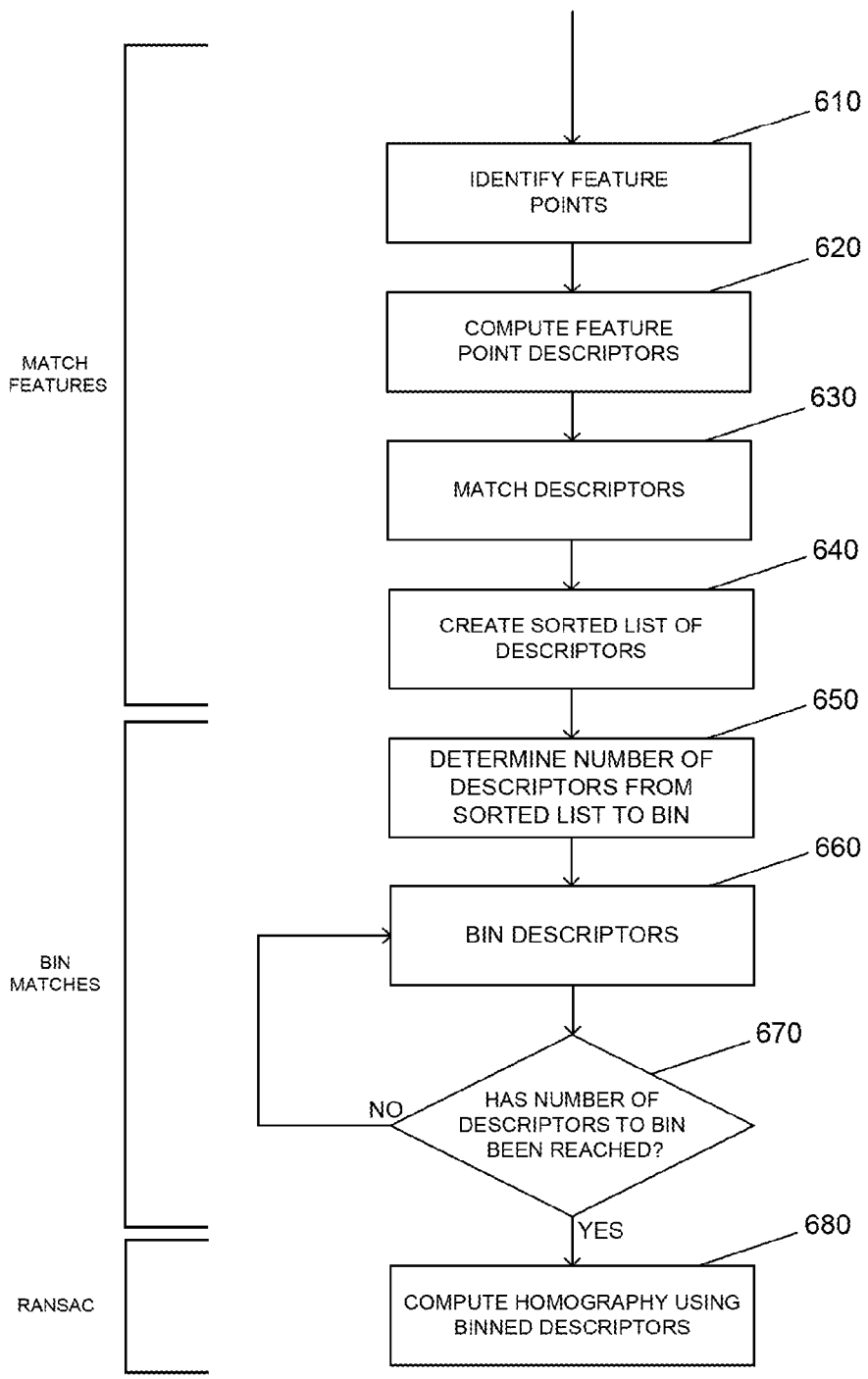
FIG. 6 is a flow diagram of a method for calculating a homography between two sequential video frames in accordance with an aspect of the disclosure.

FIG. 6 is a flow diagram of a method 600 for calculating a homography between two sequential video frames. It should be understood that the following operations do not have to be performed in the precise order described below. Rather, various steps may be handled in a different order or simultaneously. Steps may also be added or omitted unless otherwise stated.

At stage 610, feature points may be identified on a frame by frame basis from a captured video stream. According to one example, frames of the video stream may be analyzed using feature detection functions, such as OpenCV GoodFeatureToTrack. If feature points are found in a video frame, then corresponding feature points may be located in the next sequential video frames from the video stream.

At stage 620, feature point descriptors may be computed to capture information in a region around the detected feature points. For example, a simple descriptor could be a square patch of pixels surrounding a feature point. Other examples of descriptors may be ORB, SURF and Binary Robust Independent Elementary Features (BRIEF). BRIEF descriptors are binary strings computed from a square patch of pixels surrounding a detected feature point. In one aspect, BRIEF descriptors may be used to match points between a sequential video frame pair.

At stage 630, descriptors from the video frames may be matched. One by one, each descriptor from a selected video frame maybe compared to descriptors in another video frame in order to detect matches. For example, matching descriptors can be detected by comparing a pair of descriptors using a Hamming distance, which determines where the descriptors may be different. In one aspect, the Hamming distance between two descriptors can be computed by performing a binary operation such as XOR on corresponding bits in the pair of descriptors. As an illustration, if inputs A and B represent BRIEF descriptors and C is output from an XOR function, the table below represents a sample output from the XOR function of A and B:

| A | | B | | C |
|---|---|---|---|---|
| 0 | XOR | 0 | -> | 0 |
| 0 | XOR | 1 | -> | 1 |
| 1 | XOR | 0 | -> | 1 |
| 1 | XOR | 1 | -> | 0 |

The resulting number of "on" bits in output column C, e.g., where C=1, can be counted to determine whether the BRIEF descriptors A and B are similar. For example, descriptor pairs between two video frames that have smaller Hamming distances are more likely closer in similarity and thus better matches.

In one example, method 600 may be configured to compare a maximum of 250 brief descriptors per video frame where each descriptor may be configured to an equal length of 16 bytes. In this example, using a processor to calculate the Hamming distance between two video frames may take approximately (250 descriptors*250 descriptors 16 bytes*frames) 2,000,000 operations. Each operation may take approximately one cycle on a 1 GHz processor, thus an approximate full running time of the operations may take approximately 2 ms. Performance of the operations may be further improved by restricting the maximum number of feature point descriptors method 600 may compare per image.

At stage 640, a sorted list of descriptors may be created. This list may be sorted so that pairs of descriptors that are more likely similar are located at the top of the list. For example, corresponding pairs of descriptors, e.g., feature points descriptors from two sequential video frames, may be sorted in ascending order by their Hamming distance. As an illustration, the sorted list may be organized into a list of nodes such as a linear linked list. The fields of each node of the list could include a pair of corresponding descriptors and an address of the next node in the list.

At stage 650, a number may be determined to indicate a maximum amount of feature point descriptors from the sorted list to bin in a grid. In the binning process, a video frame may be partitioned into a grid, e.g., a graph having bins, where each quadrant of the grid may represent an area of a video frame. The configuration of bins per grid may be proportionate to the number of matching feature point descriptors determined to be binned per image. In one example, the configuration of bins per grid is slightly more than the number of matches that can be binned. According to one aspect, the grids may be configured so that each feature point descriptor occupies only one bin at a time. The number determined at this stage may impact the quality of a homography mapping. Based on empirical data, if the number configured is less than a threshold value, e.g., a threshold value of 30, a homography mapping between a pair of video frames may degrade in quality, for example, images may be blurred. If the number is below a certain level, e.g., less than four, then it may not be possible to compute a homography.

At stage 660, a pair of descriptors from the sorted list may be binned into corresponding grids. For example, starting with a first node of a sorted list of nodes and working through to the remaining nodes in successive order, each pair of descriptors associated with a current node may be selected for binning, e.g., processing from the smaller Hamming distances to larger ones. According to aspects, descriptor pairs at the top of the list may have the greatest possibility of matching. In one aspect, a number of feature point descriptors may be disposed into a bin where the feature point does not violate a predetermined binning constraint. For example, a binning constraint can be that the Hamming distance may not be below a threshold value, e.g. a very large Hamming distance could mean that the descriptors may be overly dissimilar, thus degrading the homography calculation.

At stage 670, it may be continually tested whether the determined number of descriptors to bin has been reached. If the determined number has been reached, then method 600 may proceed to stage 680. Otherwise, method 600 may repeat stage 660 and select another node from the top of the sorted list to bin.

At stage 680, a homography may be computed by estimating locations of inliers and outliers from amongst the binned descriptors using, for example, Random Sample Consensus (RANSAC). RANSAC is an iterative method to estimate parameters of a mathematical model from a set of observed data, which contains outliers. In some aspects, coordinal locations of feature points may be estimated and used to map one grid to another, thus creating a homography mapping between two grids. In one example, the binned inliers may be the stronger matching feature points that may exist between video frames and the outliers may be descriptors that are outside of a predefined range. According to some aspects, the top 30 iliers may be used to compute a homography. If fewer than 30 matching inliers are used, it may be difficult to find a homography mapping between two video frames. If more are used, performance of method 600 may degrade, e.g., slow down, but it may still be possible to find a homography.

Figure 7:
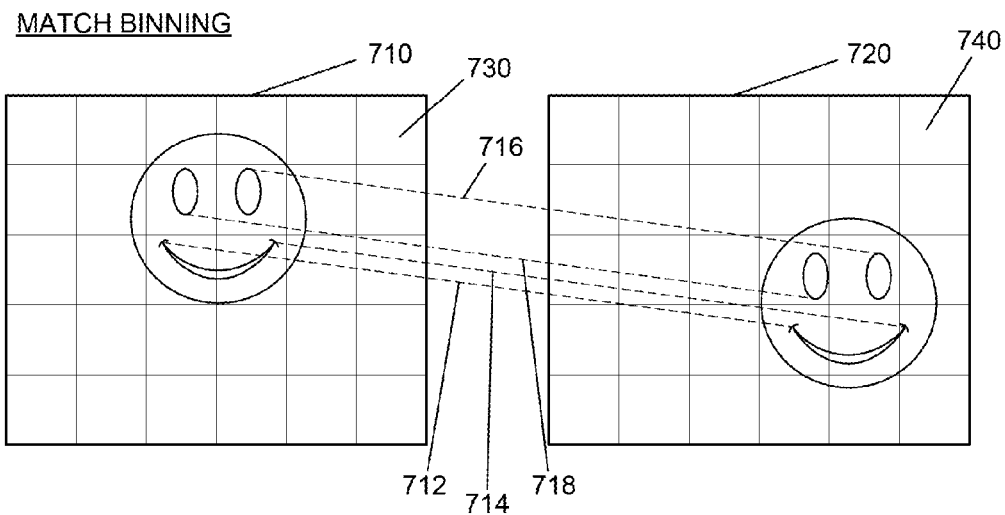
FIG. 7 is a pictorial diagram illustrating binned feature points in a pair of sequential video frames in accordance with an aspect of the disclosure.

FIG. 7 is a pictorial diagram illustrating binned feature points in a pair of sequential video frames. As shown, each grid 710, 720 may correspond to a sequential video frame in a video stream. In this illustration, one feature point may occupy a single bin 730, 740. This may assist in preventing similar features in one video frame from inadvertently matching the same feature in a sequential video frame, which can result in a degenerate homography mapping. For example, binning may ensure that the left and right eyes, e.g., similar features, in grid 710 match to only one occurrence of an eye in grid 720.

As discussed above, the number of bins in a grid may be kept proportionate to the number of matching feature points that may be graphed. As shown in FIG. 7, lines 712-718 indicate possibly matching feature points between video frames that may have been detected using, for example, method 600. In one aspect, pairs of descriptors may be sorted by their strengths into lists, e.g., those most likely to match based on their Hamming distance. By iterating over the sorted list, descriptor pairs that do not violate a binning constraint may be disposed into the grids one at a time. Accordingly, at the end of the binning process matching features may be spread out amongst the grids, thus providing for a suitable nomography mapping between two grids 710, 720, e.g., video frames.

Figure 8:
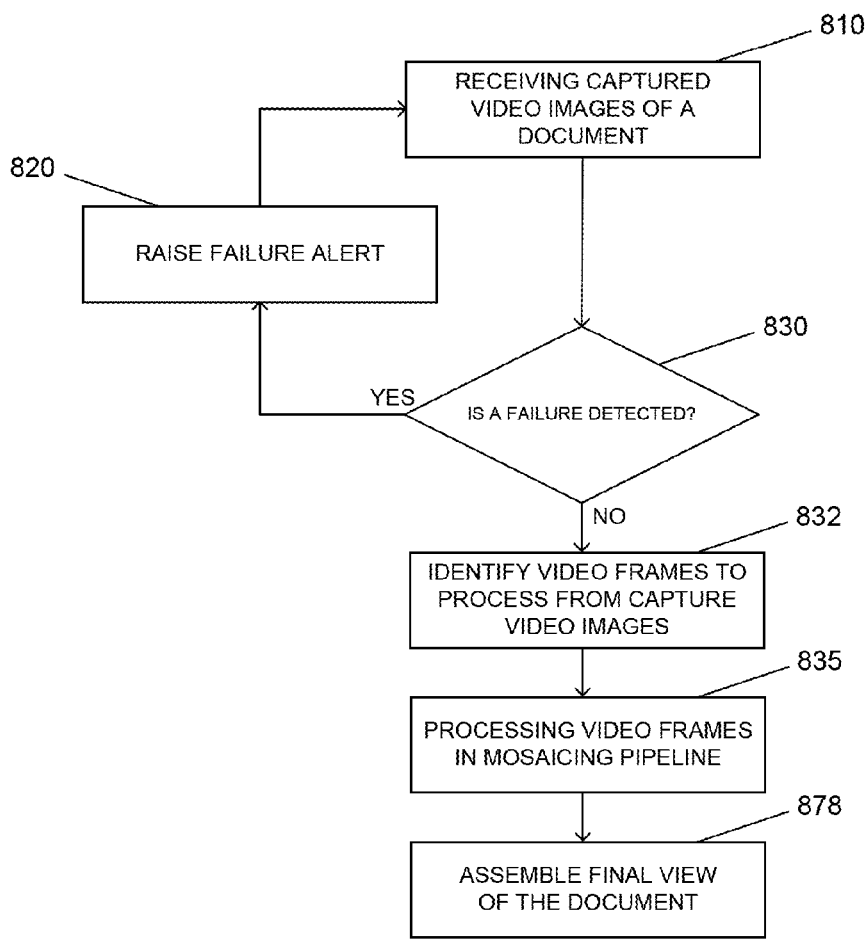
FIG. 8 is a flow diagram of a method for processing video images in accordance with an aspect of the disclosure.

FIG. 8 is a flow diagram of a method 800 for processing video images in accordance with aspects of the present technology. At block 810, a user captures a video stream of a physical document, e.g., by scanning the document with a video capturing device. Video stream of the document may be saved as a number of sequential video frames. As previously discussed, a video capturing device may be a digital camera having video capture capabilities such as a camera in a mobile phone, a video camera or other types of devices with video capture features. The video frames may be stored on a type of non-transitory computer readable medium capable of storing information such as a hard-drive, memory card, ROM, RAM, DVD, CD-ROM, write-capable, and read-only memories.

At stage 830, it may be determined whether a failure was detected. For example, a failure may have occurred during image capture of a document. Such failures may include, for example, detecting that the scanned document is not in a planar state, that there may not be sufficient overlap between video frames and that video frames may not contain sufficient texture. Other types of failures may indicate to a user that an area of the document was not scanned or that there is insufficient ambient lighting for scanning. It should be understood that this list of failure events is merely used as an illustration and that other types of failure events can be detected based on a number of pre-configured settings.

If a failure is detected then the system may raise a failure alert at stage 820. According to one aspect, the alert may prompt a user to take some action such as repeat scanning. The failure alert may be carried out, for example, by causing the video capturing device to vibrate or chime. Another way to raise a failure alert may be to show users information on a display. For example, the display might indicate which images have not been successfully captured. This may prompt the user to rescan certain portions of the document. An acknowledgement may be raised to inform the user that the video capture was successful.

At stage 832, if the document is successfully scanned without failure, video frames from the captured video images may be identified for processing. For example, a pair of sequential video frames from the captured video images may be identified. Each identified video frame may include a number of feature points. As previously discussed, feature points are image points that can be differentiated from their neighboring image points. It should be noted that processing of the video frames may depend on the number of feature points indentified per video image. At stage 835, the identified video frames may be then processed, e.g., mapped together using homography calculations, in a mosaicing pipeline 835 to reconstruct a full view of the document. The mosaicing pipeline 835 is described in further detail with respects to FIG. 9. At stage 878, a final view of the document may be assembled from the processed video frames. In one aspect, the final view may depict a full view of one side of the document.

Figure 9:
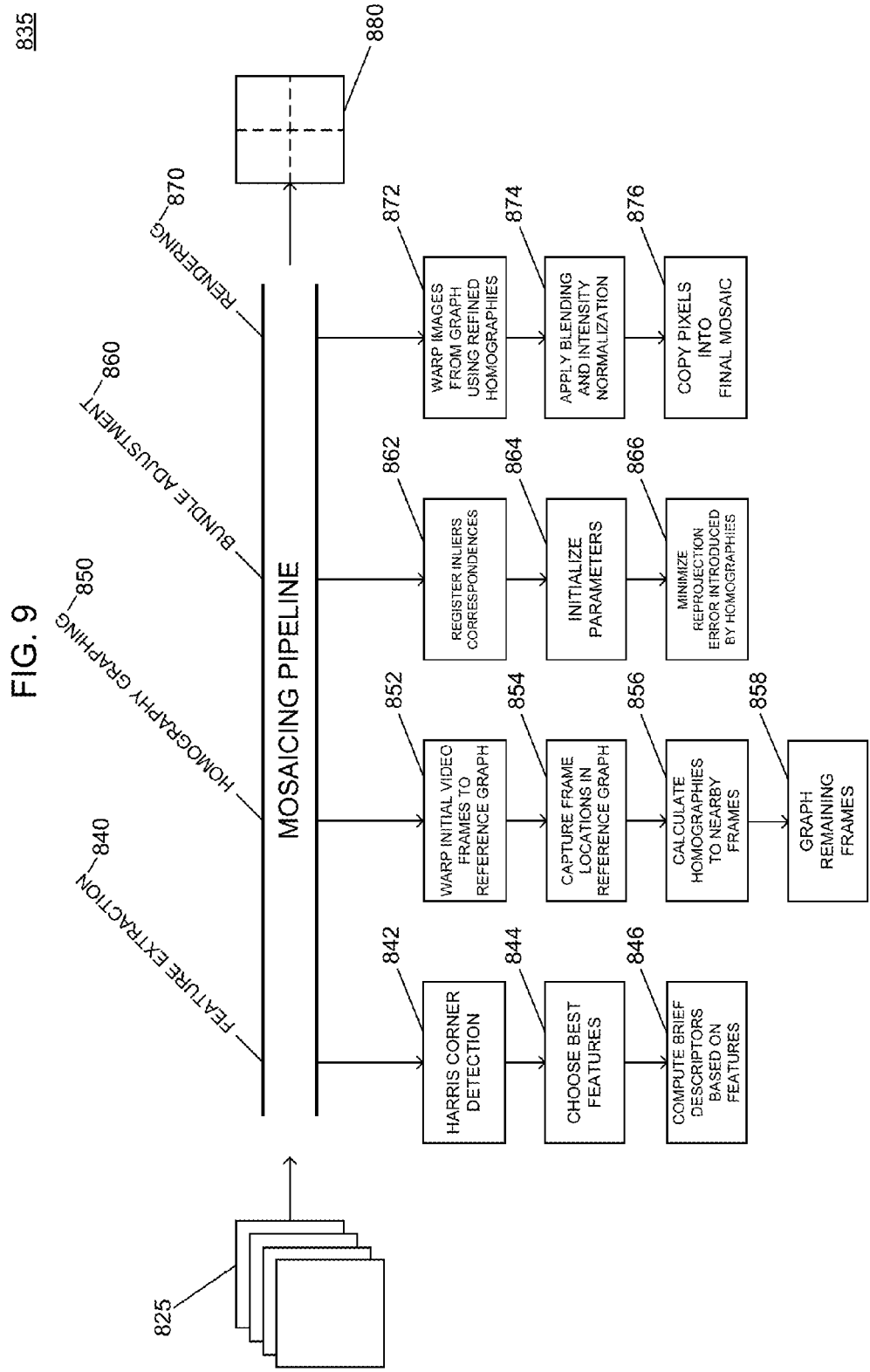
FIG. 9 is a flow diagram of a method for reconstructing a document mosaic using a video stream in accordance with an aspect of the disclosure.

FIG. 9 is a flow diagram of a method 835 for reconstructing a document mosaic 880 using a video stream 825 in accordance with one embodiment of the present technology. According to some aspects, there may be four basic stages 840-870 to the document mosaicing pipeline 835. In the feature extraction stage 840, feature points may be located in video frames from a source video stream and descriptors may be computed at the feature point locations. In the homography graphing stage 850, feature point descriptors and feature locations may be used to estimate homographies relating video frames to each other. This may be possible if the document is a near planar state, for example, flat or level. In the bundle adjustment stage 860, global video frame alignments may be made to minimize reprojection errors of shared features in the video frames. Finally, in the rendering stage 870, the video frames may be warped into a common reference space using the homographies, thus creating a reconstructed mosaic of the original document.

As illustrated, a captured video stream 825 may be processed through the mosaicing pipeline 835 resulting in a complete view of the entire document 880 as though it were taken with a single camera shot. Each stage 840-870 of image processing performed in the mosaicing pipeline 835 may consist of a series of discrete operations. This may mean that the output of one process can be the input of the next process. In one aspect, processing may be performed in whole or in part on a mobile device such as a mobile smart phone.

At stage 840, salient feature points may be extracted from video frames in a video stream. As previously discussed, feature points can be image points that may be differentiated from their neighboring image points, e.g., sharp changes in the gradient of an image.

At stage 842, Harris corners, e.g., identifiable corners present in an image, may be used to determine salient feature points in the scanned video frames. Harris corners may be used to detect feature points in textual images because these types of images can generate a large variation in gradient when moved around. For example, printed text has a high contrast to background ratio, giving sharp changes in the gradient near the terminal points of characters.

At stage 844, the best feature points may be chosen using, for example, feature detection functions such as OpenCV GoodFeatureToTrack. GoodFeatureToTrack may be used because it automatically spreads features out by choosing features with the strongest Harris response within a certain radius. According to aspects, the discovered feature points may be (x, y) pixel coordinates in the video frames that provide no other information about the frames.

At stage 846, BRIEF descriptors may be computed for each of the discovered features. The BRIEF descriptors may also compensate for some rotational invariance caused by, for example, a user slightly rotating a camera during image capture 810. As previously discussed, BRIEF descriptors are binary strings computed from a square patch of pixels surrounding feature points. Once BRIEF descriptors have been computed, a homography mapping between video frames may be calculated so that video frames can be graphed together.

Video frame homographies may be computed and concatenated together at stage 850. A predetermined norm value may also be used to normalize the concatenated video frames. For example, by changing a range of pixel intensity values based on the norm value the clarity of a final image may be increased.

At stage 852, video frame homographies may be warped together using homography mappings between video frames. During the concatenation of video frames, a homography may be computed to the previous video frame in order to provide an edge of the graph. For example, a first video frame may be chosen as an initial reference frame for warping video frames to the graph. The bounds of the graph, e.g., the outside lining of the graph, may be warped onto the graph by concatenating corresponding homographies from sequential video frames.

At stage 854, once video frames comprising the bounds of the graph are mapped, locations of the graph's centroid and radii may be computed. For example, centroids can be used to determine which video frame may be near the center of the graph. This video frame may be used as a final reference frame for rendering.

For each video frame a normalized distance to a sequential video frame may be calculated in stage 856 using the centroid and radii values. This may give a rough estimation of which frames have significant overlap and which additional homographies may need to be computed. After new homographies are calculated there may be multiple paths from one video frame to a newly chosen reference video frame.

At stage 858, remaining frames may be graph. For example, the remaining frames may be frames that may not have been previously mapped, which include regions that make up the entire image of the scanned document. According to aspects, a minimum spanning tree (MST) of the graph may be computed at stage 858 to assist in mapping frames to a final graph. This may minimize multiplication errors that can occur when homographies were concatenated together. Various optimization techniques may also be used to further minimize errors.

At stage 860, bundle adjustments may be employed in order refine homographies thereby limiting errors that can occur from the concatenation of the homographies. At stage 862, inliers correspondences from the homographies may be registered. As discussed above, inliers are feature point matches that may exist between video frames. Inlier registration may transform data points comprising the feature point descriptors into one common coordinate system, such as a final reference graph. Registration may be necessary in order to compare and integrate homographies.

An initialization stage 864 determines parameters used in initially calculating the homographies such as how many iliner correspondences were detected between video frames. In this regard, knowing the number of correspondences that should exist between video frames can reduce misalignment errors by assuring that all correspondences are taken into account when refining the homographies.

At stage 866, reprojection errors introduced by the homographies may be minimized. Reprojection errors are geometric errors corresponding to an image distance between a projected point and a measured one. For example, they measure how well projections of the reconstructed video frames reproduce a scanned document. To minimize the amount of reprojection errors introduced by the concatenation of homographies, graph homographies that may increase the reprojection error may be filtered out.

At stage 870, a virtual view of a document may be rendered from a final reference space. Calculated homographies between video frames may be used to warp images into a common reference space at stage 872. The reference space can be used to render the final virtual view of a document. According to aspects, each video frame can be concatenated to the graph one at a time using the refined homographies from stage 866.

At stage 874, intensity normalization can be applied to adjust variations in lighting from video frame to video frame. For example, if an intensity range of the video frames is below a desired range, the normalization process may entail adding a pre-determined intensity factor to each pixel of the video frames. Blending may also be applied at this stage to correct misregistration errors near the edges of the individual video frames.

At stage 876, the document mosaic may be finalized by copying pixels from the reference space onto a final view 880. For example, copying may be employed by an image copying utility, a computer program or other types of image copying techniques known in the arts. According to aspects, the final view may be a type of non-transitory computer readable medium capable of storing information accessible by a processor, such as a hard-drive, memory card, ROM, RAM, DVD, CD-ROM, write-capable, and read-only memories. In one example, the final view may be used as input to an OCR engine for translating the scanned document stored therein.

The above-described aspects of the disclosure may be advantageous for rapidly reconstructing video streams into high quality document images capable of being translated by an OCR. By introducing techniques to reduce a number of processing failures, better homographies may be calculated, and final images comprising sequential video frames may be rendered faster. Moreover, various techniques and parameters disclosed within may be reconfigured to further decrease overall runtime performance.

Although the present technology has been described with reference to particular embodiments, it should be understood that these examples are merely illustrative of the principles and applications of the present technology. For example, it should be understood that the described systems and methods can be performed in part or in their entirety on a mobile client device, such as a mobile phone, on a remote computing device, or on some combination thereof. Additionally, it should be understood that numerous other modifications could be made to the illustrative embodiments. However, these and that other arrangements may be devised without departing from the spirit and scope of the present technology as defined by the appended claims.

The invention claimed is:

1. A method, comprising:
    receiving a first image of a first view of a document, and a second image of a different, second view of the document;
    selecting multiple visual features from the first image, and multiple visual features from the second image;
    selecting, for each of the multiple visual features from the first image, a set of pixels that are located adjacent to the visual feature from the first image;
    selecting, for each of the multiple visual features from the second image, a set of pixels that are located adjacent to the visual feature from the second image;
    comparing, by one or more computers, each of the sets of pixels from the first image to each of the sets of pixels from the second image to select pairs of sets of pixels that are characterized as matching;
    determining, by the one or more computers, that a quantity of a subset of the pairs of sets of pixels that include (i) a set of pixels that are associated with a first grid location within the first image, and (ii) a set of pixels that are associated with a second grid location within the second image, satisfies a threshold;
    mapping, by the one or more computers, the first grid location within the first image to the second grid location within the second image based on determining that the quantity of a subset of the pairs of sets of pixels that include (i) a set of pixels that are associated with a first grid location within the first image, and (ii) a set of pixels that are associated with a second grid location within the second image, satisfies the threshold; and
    generating a composite view of the document using the first image and the second image based on mapping the first grid location within the first image to the second grid location within the second image.

2. The method of claim 1, wherein comparing each of the sets of pixels from the first image to each of the sets of pixels from the second image to select pairs of sets of pixels that are characterized as matching comprises:
    for each of the sets of pixels from the first image, generating a similarity measure for each of the sets of pixels from the second image, the similarity measure representing one or more similarities between the set of pixels from the first image to the set of pixels from the second image.

3. The method of claim 2, wherein the similarity measure comprises a Hamming distance.

4. The method of claim 2, wherein comparing each of the sets of pixels from the first image to each of the sets of pixels from the second image to select pairs of sets of pixels that are characterized as matching comprises:

characterizing the pairs of sets of pixels as matching based on the generated similarity measures.

5. The method of claim 2, wherein comparing each of the sets of pixels from the first image to each of the sets of pixels from the second image to select pairs of sets of pixels that are characterized as matching comprises:

selecting up to a predetermined number of pairs of the sets of pixels from the first image and the sets of pixels from the second image with the highest generated similarity measures.

6. The method of claim 2, wherein a visual feature of the multiple visual features from the first image comprises a distinct set of pixels from the first image.

7. The method of claim 1, wherein the set of pixels that are located adjacent to the visual feature from the first image surround the visual feature from the first image.

8. The method of claim 1, comprising:

performing an optical character recognition process using the composite view.

9. A system comprising:

one or more computers and one or more storage devices storing instructions that are operable, when executed by the one or more computers, to cause the one or more computers to perform operations comprising:

receiving a first image of a first view of a document, and a second image of a different, second view of the document;

selecting multiple visual features from the first image, and multiple visual features from the second image;

selecting, for each of the multiple visual features from the first image, a set of pixels that are located adjacent to the visual feature from the first image;

selecting, for each of the multiple visual features from the second image, a set of pixels that are located adjacent to the visual feature from the second image;

comparing each of the sets of pixels from the first image to each of the sets of pixels from the second image to select pairs of sets of pixels that are characterized as matching;

determining that a quantity of a subset of the pairs of sets of pixels that include (i) a set of pixels that are associated with a first grid location within the first image, and (ii) a set of pixels that are associated with a second grid location within the second image, satisfies a threshold;

mapping the first grid location within the first image to the second grid location within the second image based on determining that the quantity of a subset of the pairs of sets of pixels that include (i) a set of pixels that are associated with a first grid location within the first image, and (ii) a set of pixels that are associated with a second grid location within the second image, satisfies the threshold; and generating a composite view of the document using the first image and the second image based on mapping the first grid location within the first image to the second grid location within the second image.

10. The system of claim 9, wherein comparing each of the sets of pixels from the first image to each of the sets of pixels from the second image to select pairs of sets of pixels that are characterized as matching comprises:

for each of the sets of pixels from the first image, generating a similarity measure for each of the sets of pixels from the second image, the similarity measure representing one or more similarities between the set of pixels from the first image to the set of pixels from the second image.

11. The system of claim 10, wherein the similarity measure comprises a Hamming distance.

12. The system of claim 10, wherein comparing each of the sets of pixels from the first image to each of the sets of pixels from the second image to select pairs of sets of pixels that are characterized as matching comprises:

characterizing the pairs of sets of pixels as matching based on the generated similarity measures.

13. The system of claim 10, wherein comparing each of the sets of pixels from the first image to each of the sets of pixels from the second image to select pairs of sets of pixels that are characterized as matching comprises:

selecting up to a predetermined number of pairs of the sets of pixels from the first image and the sets of pixels from the second image with the highest generated similarity measures.

14. The system of claim 10, wherein a visual feature of the multiple visual features from the first image comprises a distinct set of pixels from the first image.

15. The system of claim 9, wherein the set of pixels that are located adjacent to the visual feature from the first image surround the visual feature from the first image.

16. A non-transitory computer-readable medium storing software comprising instructions executable by one or more computers which, upon such execution, cause the one or more computers to perform operations comprising:

receiving a first image of a first view of a document, and a second image of a different, second view of the document;

selecting multiple visual features from the first image, and multiple visual features from the second image;

selecting, for each of the multiple visual features from the first image, a set of pixels that are located adjacent to the visual feature from the first image;

selecting, for each of the multiple visual features from the second image, a set of pixels that are located adjacent to the visual feature from the second image;

comparing each of the sets of pixels from the first image to each of the sets of pixels from the second image to select pairs of sets of pixels that are characterized as matching;

determining that a quantity of a subset of the pairs of sets of pixels that include (i) a set of pixels that are associated with a first grid location within the first image, and (ii) a set of pixels that are associated with a second grid location within the second image, satisfies a threshold;

mapping the first grid location within the first image to the second grid location within the second image based on determining that the quantity of a subset of the pairs of sets of pixels that include (i) a set of pixels that are associated with a first grid location within the first image, and (ii) a set of pixels that are associated with a second grid location within the second image, satisfies the threshold; and generating a composite view of the document using the first image and the second image based on mapping the first grid location within the first image to the second grid location within the second image.

17. The medium of claim 16, wherein comparing each of the sets of pixels from the first image to each of the sets of pixels from the second image to select pairs of sets of pixels that are characterized as matching comprises:

for each of the sets of pixels from the first image, generating a similarity measure for each of the sets of pixels from the second image, the similarity measure representing one or more similarities between the set of pixels from the first image to the set of pixels from the second image.

18. The medium of claim 17, wherein comparing each of the sets of pixels from the first image to each of the sets of pixels from the second image to select pairs of sets of pixels that are characterized as matching comprises:
   characterizing the pairs of sets of pixels as matching based on the generated similarity measures.

19. The medium of claim 17, wherein comparing each of the sets of pixels from the first image to each of the sets of pixels from the second image to select pairs of sets of pixels that are characterized as matching comprises:
   selecting up to a predetermined number of pairs of the sets of pixels from the first image and the sets of pixels from the second image with the highest generated similarity measures.

20. The medium of claim 17, wherein a visual feature of the multiple visual features from the first image comprises a distinct set of pixels from the first image.

* * * * *